(12) United States Patent
Gibart et al.

(10) Patent No.: US 7,328,370 B2
(45) Date of Patent: Feb. 5, 2008

(54) SAFETY CONTROLLER WITH SIMPLIFIED INTERFACE

(75) Inventors: Anthony Gerard Gibart, New Berlin, WI (US); Paul G. Kucharski, Waukesha, WI (US); Joseph Paul Izzo, New Berlin, WI (US); Raymond Louis Buvel, Wauwatosa, WI (US); Michael Dean Kalan, Highland Heights, OH (US); Charles Martin Rischar, Chardon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 763 days.

(21) Appl. No.: 10/663,864

(22) Filed: Sep. 16, 2003

(65) Prior Publication Data

US 2005/0091410 A1    Apr. 28, 2005

Related U.S. Application Data

(63) Continuation-in-part of application No. 10/661,885, filed on Sep. 12, 2003, now Pat. No. 7,228,390.

(51) Int. Cl.
*G06F 11/00*    (2006.01)

(52) U.S. Cl. .............................. 714/11; 700/12; 700/79

(58) Field of Classification Search .................. 714/11; 700/12, 79
See application file for complete search history.

(56) References Cited

U.S. PATENT DOCUMENTS

| 5,561,767 | A   | * | 10/1996 | Eisenberg et al. ............ 714/47 |
| 5,687,310 | A   | * | 11/1997 | Rotker et al. .................. 714/11 |
| 6,393,582 | B1  | * | 5/2002  | Klecka et al. ................. 714/11 |
| 6,631,476 | B1  |   | 10/2003 | Vandesteeg et al. |
| 2003/0051053 | A1 |   | 3/2003  | Vasko et al. |
| 2003/0051203 | A1 |   | 3/2003  | Vasko et al. |
| 2003/0145120 | A1 |   | 7/2003  | Vasko et al. |
| 2003/0208283 | A1 |   | 11/2003 | Vasko et al. |
| 2005/0060605 | A1 | * | 3/2005  | Gibart et al. ................. 714/11 |

* cited by examiner

*Primary Examiner*—Michael C Maskulinski
(74) *Attorney, Agent, or Firm*—Keith M. Baxter; R. Scott Speroff

(57) ABSTRACT

A safety controller with redundant controllers, each executing safety tasks and comparing their results, provides an improved interface in which a user interacts with a single processor and the second processor is invisible. The interacting processor provides for the transmission of programs and variables to both processors when they are safety tasks and coordinates synchronization of the two programs and comparison of their operation all without additional user input.

41 Claims, 5 Drawing Sheets

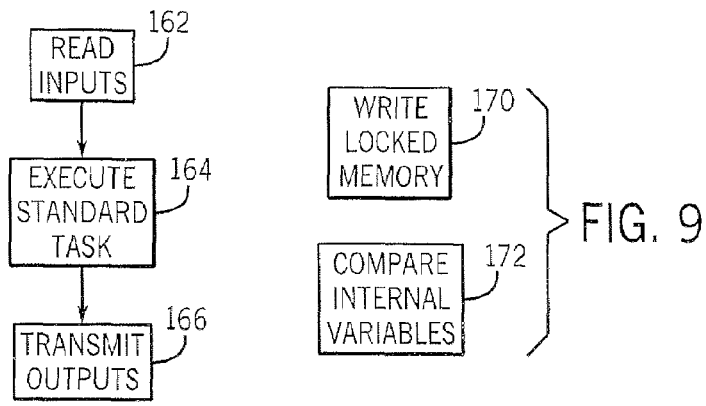
FIG. 8
FIG. 9
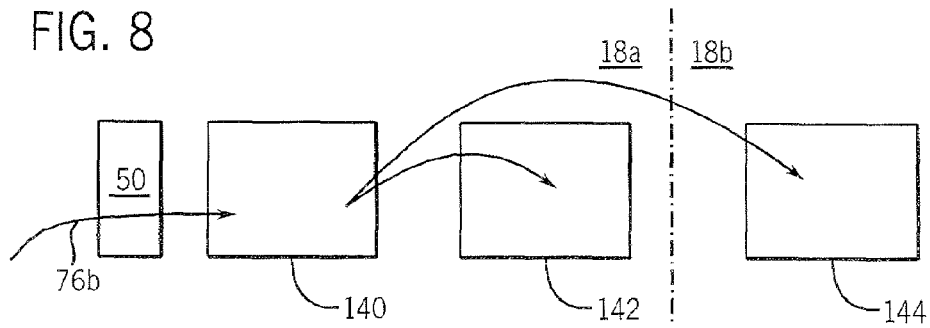
FIG. 10
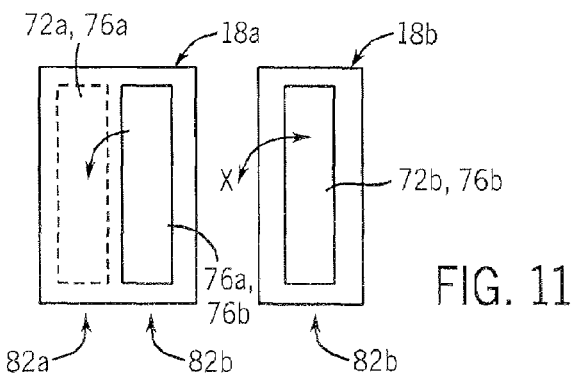
FIG. 11
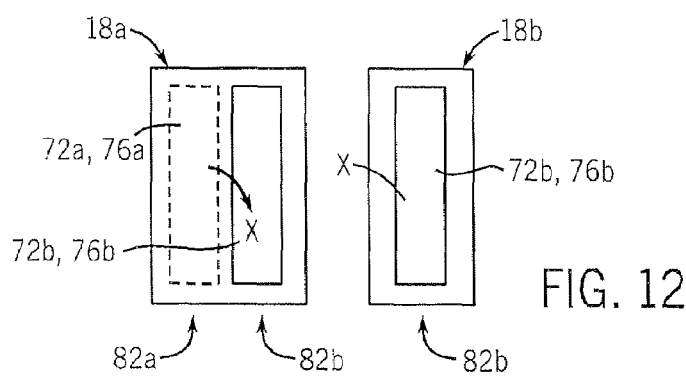
FIG. 12

SAFETY CONTROLLER WITH SIMPLIFIED INTERFACE

CROSS-REFERENCE TO RELATED APPLICATIONS

This application is a continuation-in-part of U.S. application Ser. No. 10/661,885 filed Sep. 12, 2003 now U.S. Pat. No. 7,228,390 and entitled "Safety Controller With Memory Lock".

STATEMENT REGARDING FEDERALLY SPONSORED RESEARCH OR DEVELOPMENT

BACKGROUND OF THE INVENTION

The present invention relates to industrial controllers used for real-time control of industrial processes, and in particular to "high reliability" or "safety" industrial controllers appropriate for use in devices intended to protect human life and health.

Industrial controllers are special-purpose computers used in controlling industrial processes. Under the direction of a stored, controlled program, an industrial controller examines a series of inputs reflecting the status of the controlled process and changes a series of outputs controlling the industrial process. The inputs and outputs may be binary, that is, on or off, or analog, providing a value within a substantially continuous range. The inputs may be obtained from sensors attached to the controlled process, and the outputs may be signals to actuators on the controlled process.

"Safety systems" are systems intended to ensure the safety of humans working in the environment of an industrial process. Such systems may include the electronics associated with emergency-stop buttons, light curtains, and other machine lockouts. Traditionally, safety systems have been implemented by a set of redundant circuits separate from the industrial control system used to control the industrial process with which the safety system is associated. Such safety systems have been "hardwired" from switches and relays including specialized "safety relays" which provide comparison of redundant signals and internal checking of fault conditions such as welded or stuck contacts.

Hard-wired safety systems using duplicate wiring have proven cumbersome in practice because of the difficulty of installing and connecting hardwired components and duplicate sets of wiring, particularly in complex control applications, and in part because of the difficulty of troubleshooting and maintaining a hard-wired system whose logic can be changed only by re-wiring.

For this reason, there has been considerable interest in developing industrial controllers that may implement safety systems using programs simulating the operation of the physical components in hard-wired safety systems. Industrial controllers are not only easier to program but may provide reduced installation costs by eliminating long runs of redundant wiring in favor of a high speed serial communication network and by providing improved troubleshooting capabilities. U.S. patent applications 60/373,592 filed Apr. 18, 2002; Ser. No. 10/034,387 filed Dec. 27, 2001; Ser. No. 09/667,145 filed Sep. 21 2000; Ser. No. 09/666,438 filed Sep. 21, 2000; and Ser. No. 09/663,824 filed Sep. 18, 2000, assigned to the assignee of the present invention, describe the implementation of safety systems using industrial controller architectures, and are hereby incorporated by reference.

High reliability can be obtained in an industrial controller system by employing two industrial controllers which simultaneously execute the same control program and compare their operations to detect faults. Configuring a dual controller system requires work by the operator who must now ensure not only that a first control program is correctly installed and running in a primary controller but that an identical control program has been loaded into a partner controller and that the two controllers are communicating to operate in synchrony. Editing of the program in the primary controller is complicated by the need to ensure that the identical editing is performed on the program in the partner controller. The work required to configure and maintain the dual controller system is normally in addition to work required to configure and maintain a separate standard controller devoted to standard control tasks separate from the tasks of the safety system. Personnel working on both systems must learn two sets of procedures and protocols.

These complexities and costs can deter the use of industrial control systems for safety applications.

SUMMARY OF THE INVENTION

The present invention provides an improved interface for a dual controller safety system in which the user interacts with a single apparent controller in a manner similar to a user's interaction with a standard industrial control system. A single control program is downloaded to or edited on the apparent controller and is received by a primary controller of the dual controller pair. The primary controller automatically confirms the existence of a partner controller, forwards a copy of the control program to the partner controller, and coordinates synchronous execution of the control program with the partner controller. In one embodiment in which both standard control tasks and safety control tasks can be executed on the same industrial control system, the controller pair distinguishes safety tasks from standard tasks to properly allocate them among the primary and partner controllers.

Specifically, the present invention provides a safety controller having a first and second independent controller communicating on a communication bus, including, for example, a network, backplane or serial link. A communication interface receives safety program information from a user at the first controller. A transfer program executable on the primary and partner controller automatically loads the safety program information received by the first controller to the partner controller. A synchronization program executable by the primary and partner controller executes the safety program information on the primary and partner controller and compares execution of the safety program information to enter a safety state when this execution differs.

Thus, it is one object of the invention to provide the user with a simple and familiar "single controller" interface when using a dual controller safety system. It is a further object of the invention to provide a simple mechanism for ensuring that both controllers have the same control information.

The communication interface may confirm the existence of a partner controller and receive the safety program information only when the partner controller is communicating with the primary controller on the communication bus.

It is thus another object of the invention to automatically confirm the existence of the proper components for a safety control system before accepting safety program information.

The transfer program may transfer safety program information from the primary controller to the partner controller and return an acknowledgment from the partner controller to the primary controller indicating that the transfer was complete and correct.

Thus it is another object of the invention to automatically ensure integrity in the transfer process.

The primary controller may hold an identification value indicating to a user device, such as a programming terminal having safety program information, that the primary controller may receive safety program information. The partner controller does not hold the identification value.

Thus, it is another object of the invention to provide a simple and unambiguous method of automatically identifying the primary controller to receive program information such as may be detected by a programming tool without user involvement.

The safety program information may also hold an identification value indicating that it is part of a safety application and the transfer program may check this identification value to automatically load only the safety program information into the partner controller.

Thus it is another object of the invention to allow a safety dual controller system to accept both safety program information and standard program information and to properly allocate this information between two controllers in a manner invisible to the user.

The primary controller and partner controller may be contained in independent housings separately attachable to a communication bus.

Thus, it is another object of the invention to provide a migration path from a standard control system to a safety dual controller system by the addition of a partner controller in a separate housing while providing a constant programming environment to the user.

The housing of the primary controller may include a user accessible switch defining operation of the safety controller in a "run" and "program" state, whereas the housing of the second unit need not include the user accessible switch. The transfer program may communicate the "run" and "program" state to the partner controller and the synchronization program may execute the safety program information in the primary and partner controller according to the "run" and "program" states.

Thus it is another object of the invention to provide a single-controller view both via the communication bus and with respect to manually operated switches on the housings.

The second housing may hold fewer components than the first housing to provide limited functionality.

Thus is another object of the invention to provide for a cost savings to the user in implementing safety systems by eliminating redundant features of the controllers that do not contribute to high reliability.

These particular objects and advantages may apply to only some embodiments falling within the claims and thus do not define the scope of the invention.

BRIEF DESCRIPTION OF THE FIGURES

FIG. 8 is a flowchart similar to that at FIG. 7 showing execution of a standard task on the primary and partner controllers;

FIG. 9 is a representation of two regularly scheduled tasks for checking the memory lock and comparing variables between the primary and partner controllers;

FIG. 10 is data flow chart showing the synchronization of input data per one step of FIG. 7 using a two-stage buffer to ensure uniformity of asynchronous input values;

FIG. 11 is a simplified view of FIG. 3 showing the effect of asymmetrical loading of standard and safety program information in preventing corruption of standard program information by the safety program; and FIG. 12 is a figure similar to that of FIG. 11 showing the effect of asymmetrical loading of standard and safety program information in preventing the standard program from undetected modification of safety program information.

DETAILED DESCRIPTION OF THE PREFERRED EMBODIMENT

"High reliability" and "safety" systems are those that guard against the propagation of erroneous data or signals by detecting error or fault conditions and signaling their occurrence and/or entering into a predetermined fault state. High reliability systems may be distinguished from high availability systems which attempt to remain operating after some level of failure. The present invention may be useful in both systems, however, and therefore, as used herein, high reliability and safety should not be considered to exclude high availability systems that provide safety operation.

Figure 1:
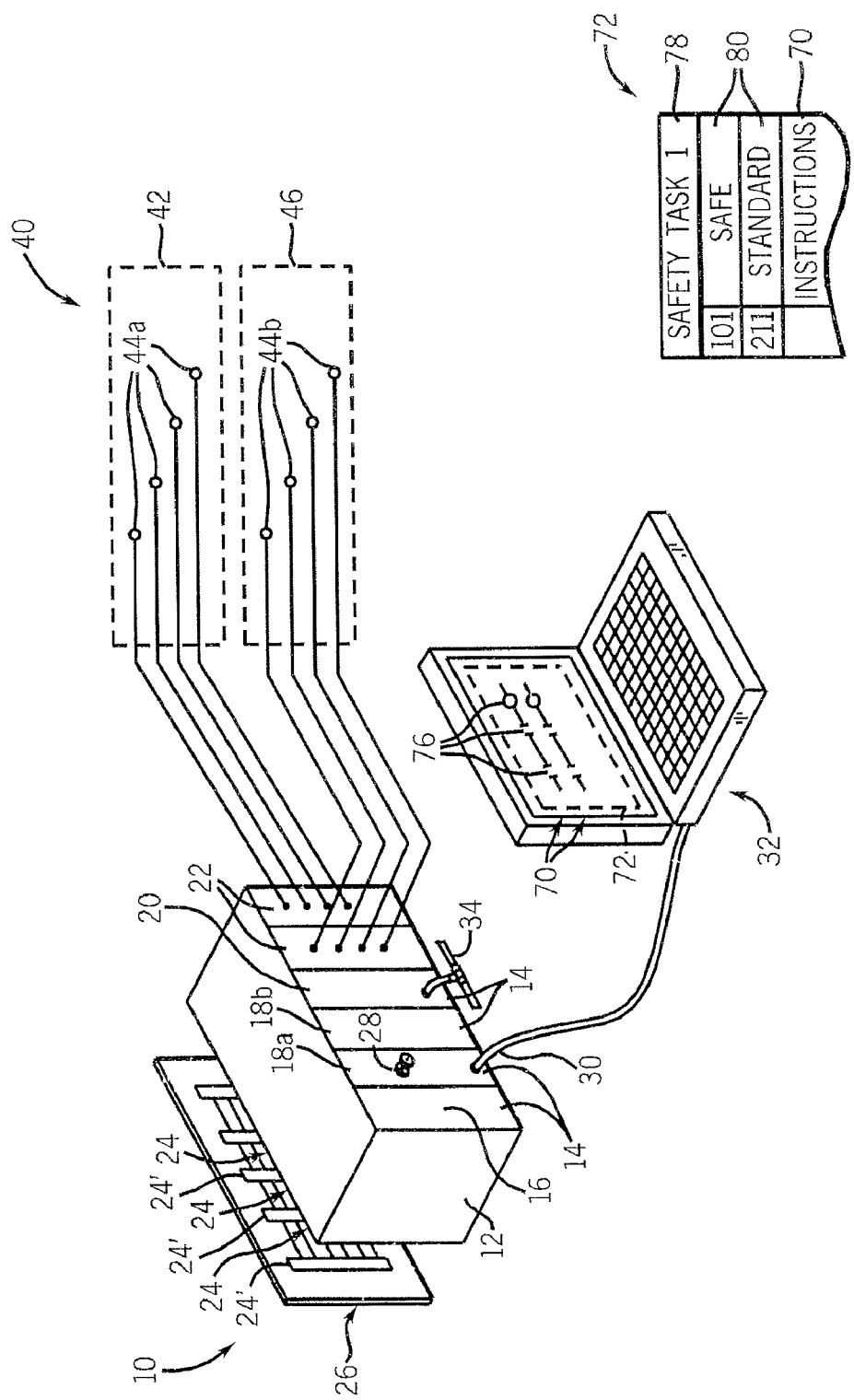
FIG. 1 is a simplified perspective view of a dual controller system suitable for use with the present invention including a primary and partner controller communicating on a backplane and a programming terminal communicating with the primary controller on a dedicated interface.

Referring to FIG. 1, a dual controller safety system 10 suitable for use with the present invention provides a chassis 12 into which a set of control modules 14 may be inserted according to the needs of the particular control application. Each of the modules 14 provides an electrical connector 24 at its rear (not shown) that may connect with a corresponding connector 24' on the front surface of a backplane 26 forming a rear wall of the chassis 12. The connectors 24' are joined by conductive traces so that modules 14 may be freely inserted into the chassis 12 to interconnect on the backplane 26 according to methods well known in the art.

The control modules 14 may generally include a power supply 16, a network module 20 and one or more input/output (I/O) modules 22, a primary controller 18a, and a partner controller 18b.

The power supply 16 may provide a source of regulated power over power conductors of the backplane 26 to the other modules 14 while the network module 20 provides a connection between communication conductors of the backplane 26 and a high speed serial network 34 such as an Ethernet or the like. The network 34 which may communicate with a remote chassis 12' (not shown) and other modules 14 including I/O modules 22 and other controllers 18. Both the backplane 26 and the network 34 (and interfaces thereto) may support a safety protocol such as that described in U.S. Patent application 60/373,592 referenced above.

The I/O modules 22 may communicate with various sensors and actuators 44a and 44b on a controlled process 40. The controlled process 40 may include standard processes 42 such as those of controlling factory equipment or the like, and safety processes 46 related to a safety applications where sensors and actuators 44a are those associated with the standard processes 42 and sensors and actuators 44b are associated with the safety processes 46. As will be described, the dual controller safety system 10 allows execution of both safety control and standard control programs sharing some of the same hardware.

The primary controller 18a and partner controller 18b each provide at least one independent processor and memory for executing a control program. Independent does not require that processor and memories be physically separated, however, that is preferred. In the preferred embodiment, the primary controller 18a and the secondary controller 18b are contained in separate housings, each independently attachable to the backplane 26. In this case, primary controller 18a includes a key switch 28 according to conventions known in the art that allows the primary controller 18a to be placed in a "run" or "programming" mode or other states that may be desirably controlled manually. The primary controller 18a also includes a serial communication port 30 such as an RS-232 port that allows it to communicate directly with a programming terminal 32. The programming terminal 32 may include standard programming tools modified for this application as will be described below.

The secondary controller does not include either the key switch 28 or the communications port 30 and may have other cost saving omissions.

Alternatively, the primary controller 18a and partner controller 18b may be placed in one housing provided the independence of the internal processing units to be described is maintained. The primary controller 18a and partner controller 18b may alternatively be in separate racks 12 connected by a high speed serial link.

Figure 2:
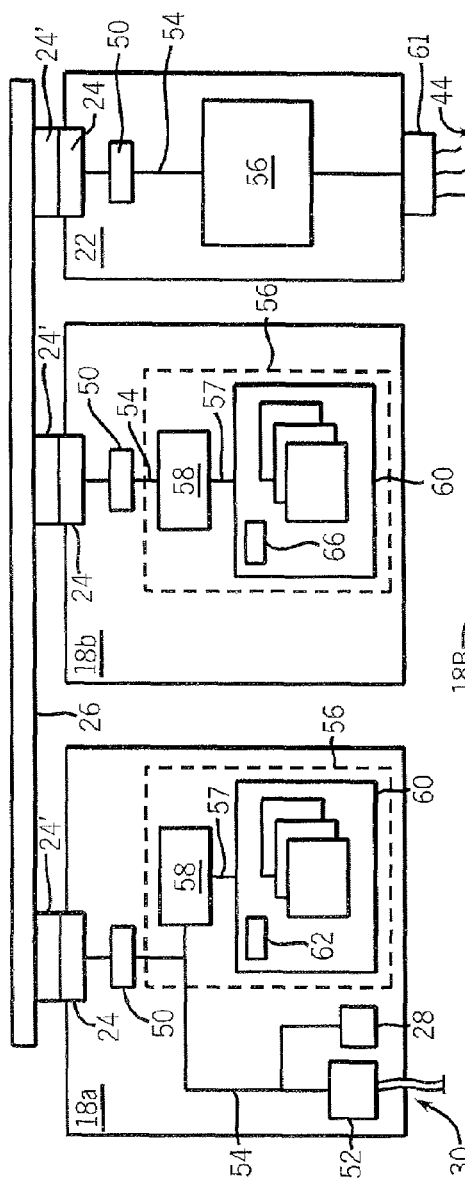
FIG. 2 is an electrical schematic representation of the primary and partner controllers of FIG. 1.

Referring now to FIG. 2, primary controller 18a may include an interface circuit 50 communicating via connector 24 with the backplane 26 and an interface circuit 52 communicating with the port 30, both connected by an internal bus 54 to a processing unit 56. Either interface circuits 50 or 52 may be used to receive programming information from the programming terminal 32 shown in FIG. 1 and interface circuit 50 may be used to communicate between primary controller 18a and partner controller 18b or any of the other modules for the communication of safety data, safety program information or other signals as will be described.

The internal bus 54 also connects with key switch 28 so that the key switch 28 (as well as each of the interface circuits 50 or 52) may be monitored by the processing unit 56.

The processing unit 56 includes a processor 58 and a memory 60, the processor 58 communicating directly with the memory 60 by means of a memory bus 57 separate from the internal bus 54 with the memory 60. Multiple processors may also be used. Memory may be a combination of volatile and non-volatile memory. In a multiprocessor system, each processor may have dedicated memory as well as shared memory. The memory 60 holds programs for an operating system and for a number of control tasks designated as either safety tasks or standard tasks. The operating system provides for the scheduling of tasks so that each task is executed in its entirety prior to the next task being invoked, however, other conventional operating systems may also be used. The memory 60 also holds I/O data received from and transmitted to the I/O modules 22. In addition, the memory 60 includes a fixed identification number 62 indicating that it is part of a primary controller 18a and suitable for execution of standard and safety tasks and for direct communication with a user and stored in non-volatile memory.

The partner controller 18b is similar to primary controller 18a but has a reduced part count eliminating interface circuit 52 and key switch 28, but providing an interface circuit 50, a processor 58, and a memory 60 all similar to those of primary controller 18a. An important exception is that partner controller 18b holds an identification number 66 in its memory indicating that it is a partner controller 18b incapable of operating alone or executing standard tasks. The memory 60 of the partner controller 18b also holds programs for an operating system and for a number of safety control tasks only. Together the programs held by the memories 60 of primary controller 18a and the partner controller 18b provide a number of system programs including a transfer and synchronization program as will be described below. As will be understood in the art, the division of the following program functions between the primary controller 18a and partner controller 18b or as between tasks and the operating system may be varied provided the described functions are maintained.

A typical I/O module 22 or network module 20 may include a first interface circuit 50 communicating over internal bus 54 with processing unit 56 and second interface circuitry 61 providing for I/O signals or communication signals as have been described.

Figure 3:
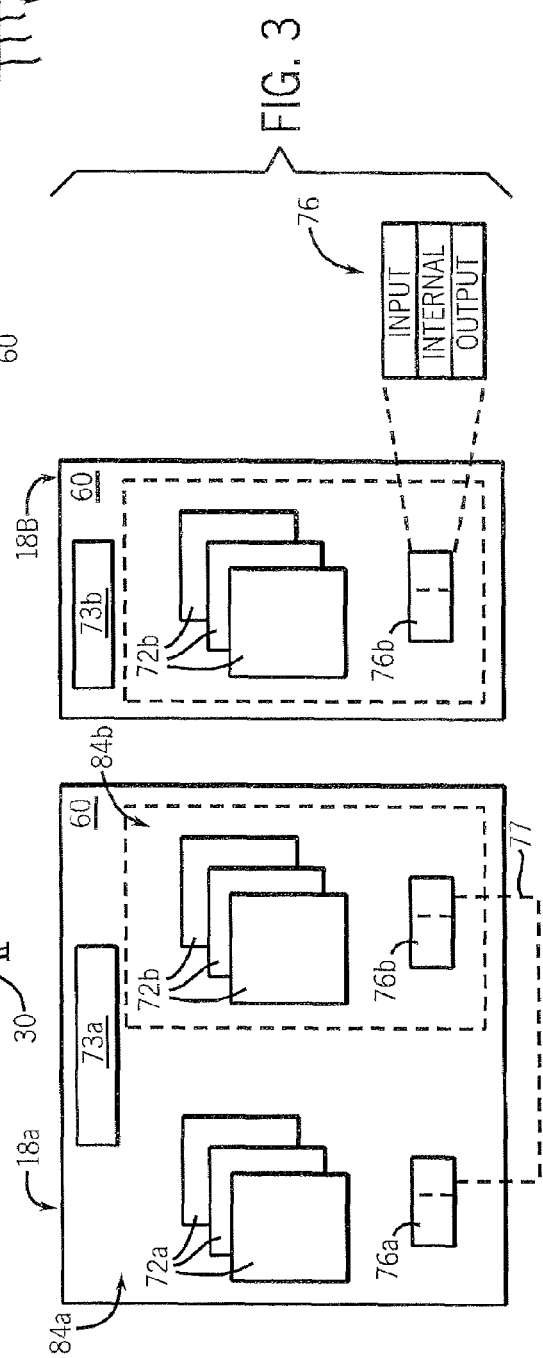
FIG. 3 is logical representation of the primary and secondary controllers of FIG. 2 showing the allocation of safety tasks and standard tasks.

Referring now to FIGS. 1 and 3, a user may operate the programming terminal 32 to enter a series of program instructions 70 here represented as rungs in a ladder logic program of a type well known in the art. The instructions may be grouped together into a task 72 representing a set of instructions that are logically executed together and which may be scheduled according to the operating system which implements multi-task scheduling methods as are generally understood in the art. Each of the instructions 70 includes variables 76 representing input and output values corresponding generally to the states of sensors and actuators 44a and 44b or internal program values. These variables 76 may have initial values that will be recorded with the task 72. The instructions may include "safety instructions" specific to safety applications that can only be executed within a safety task.

During the generation of the task 72, a programming tool on the programming terminal 32 will prompt the user to identify each of the variables 76 as a safety variable or a standard variable and the task 72 as either a safety task or a standard task. This status will be embedded in a file 73 holding the task 72 as a safety identifier 78 associated with the task and variable scoping identifiers 80 in the variable definitions portion of the file 73. Note that the present invention allows variables 76 within either a safety task 72 or standard task 72 to be designated either as standard variables 76 or a safety variable 76. A compiling program of standard design enforces this variable isolation such that standard tasks 72 may read but not write the safety variables 76 and safety tasks 72 may neither read nor write standard variables 76. Additional hardware and architectural support for this scoping is also provided as will be described below.

Referring now to FIG. 3, primary controller 18a will execute both standard tasks 72a associated with standard processes 42, and also safety tasks 72b associated with safety processes 46 using a single processing unit 56 operating in time division multiplex In this regard, the primary controller 18a will hold both standard data 76a and safety data 76b in the same physical memory 60 accessible by the processor 58 but in different regions 84 of the memory 60, one region 84a reserved for standard data 76a and one region 84b reserved for safety data 76b as will be described. In order to provide for hardware variable scoping, as will be described, certain of the standard variables 76a from region 84a may be also copied into the region 84b allocated for safety variables 76 as indicated by arrow 77.

The partner controller 18b contains only the safety tasks 72b and the safety data 76b in physical memory 60 including those copied values of the standard data 76a as has been described.

Figure 4:
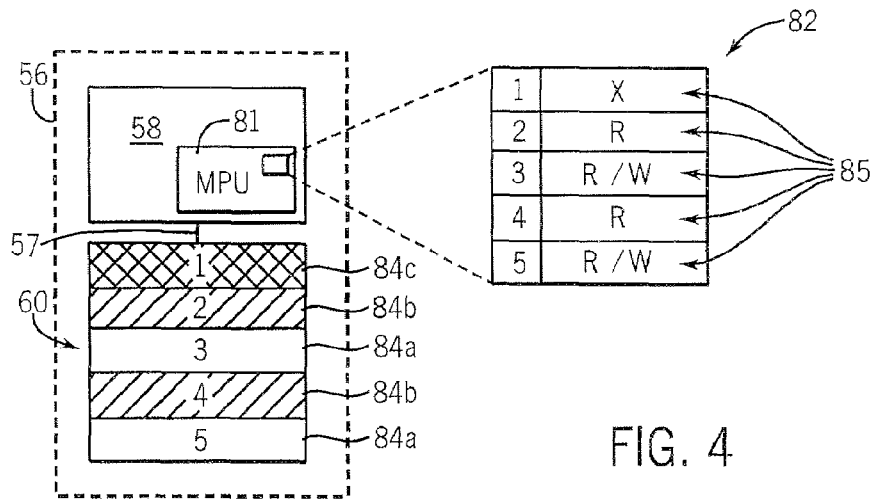
FIG. 4 is a representation of a processing unit suitable for the primary and partner controllers showing a processor with a memory protection unit and connected memory.

Referring now to FIG. 4, the processor 58 of both the primary controller 18a and partner controller 18b incorporates a memory protection unit (MPU) 81 of a type known in the art. The MPU (81) controls access by the processor 58 to memory 60 over the memory bus 57 through the use of hardware incorporated into the circuitry of the processor 58. Generally the MPU 81 employs an internal register 82 listing in entries 85 regions 84 of the memory 60 as may be flexibly defined and designating each region either as a read/write region (R/W) indicating that the region may be read or written to by the processor 58 or a read only region (R) designating that the data of this region may only be read by the processor 58 or unused indicated by an (X) indicating that this memory may be neither written to nor read from. Originally, all memory 60 is marked as a neither read nor write area indicated by (X). Access to the memory is controlled by hardware that physically prevents reading or writing according to the register settings.

Figure 5:
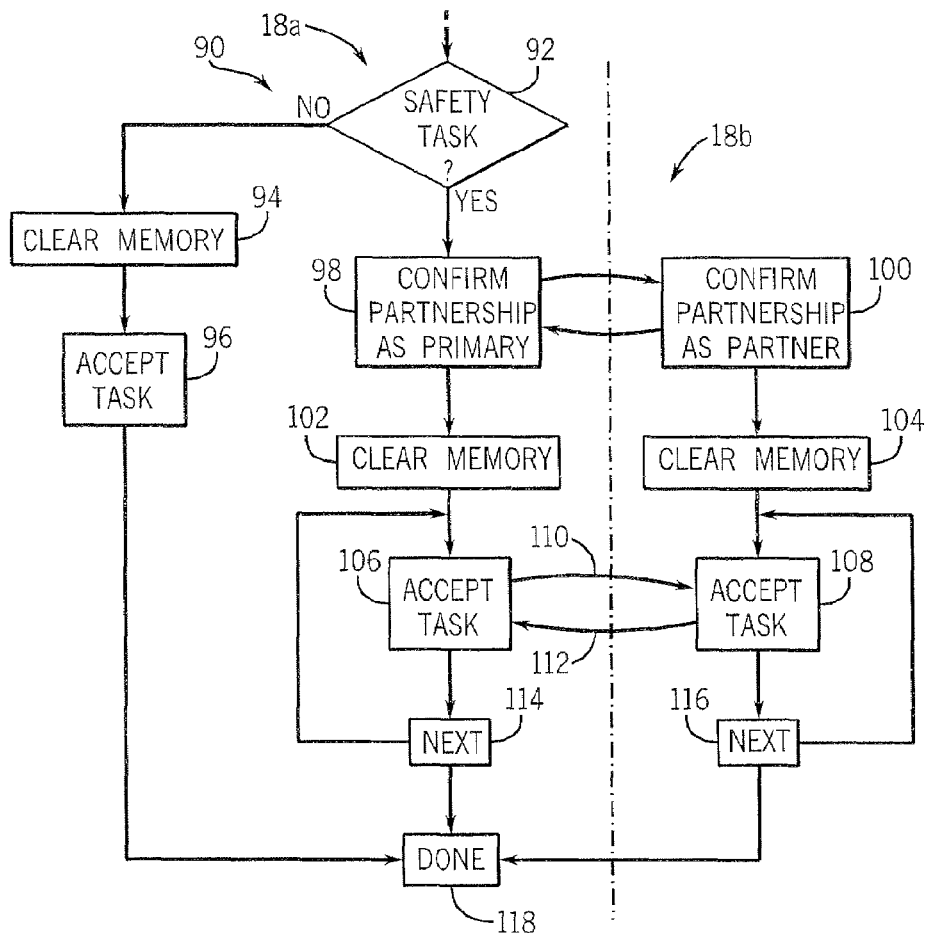
FIG. 5 is a flowchart of a transfer program executed in the primary controller for receiving programming instructions and data.

Referring now to FIG. 5 and FIG. 1, when a control program comprised of a number of tasks 72 is completed, it may be downloaded to the primary controller 18a only of the dual controller safety system 10 from the programming terminal 32 or another source by means of port 30 or network 34. The programming terminal 32 identifies the primary controller 18a by means of the identification number 62 contained in memory 60 of the primary controller 18a and opens a connection with that primary controller 18a. The primary controller 18a must be in the program mode as indicated by key switch 28 or from the programming terminal 32.

Figure 6:
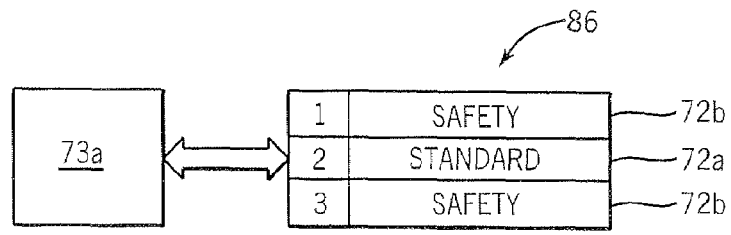
FIG. 6 is a functional diagram of an operating system used by the primary and partner controllers of FIG. 3 such as provides a task list for scheduling tasks for execution, the task list indicating whether the task is a safety or standard task.

Referring also to FIG. 6, at this time each task 72 is loaded into a task queue 86 used by the operating system 73a of the primary controller 18a to schedule each task 72 for execution using scheduling techniques well known in the art of multitasking operating systems. The task queue 86 indicates that the task 72 is a standard task or a safety task. A transfer program 90 in the primary controller 18a identifies each task 72 as a safety task or a standard task at decision block 92 based on the safety identifier 78.

The transfer program 90 in the primary controller 18a then receives each task 72 for downloading. If the task 72 is a standard task, then at process block 94, a region 84a of memory 60 in the primary controller 18a is cleared and at process block 96 the task is loaded into that region 84a. In the present invention, the regions 84a will be initially designated read or write in the register 82 for the MPU 81.

Referring again to FIG. 5, if at decision block 92, the task being received is a safety task, then at process block 98, the primary controller 18a attempts to confirm that there is a partner controller 18b by establishing a link between the primary controller 18a and the partner controller 18b by opening necessary connections on the backplane 26 or on the network 34 (for remote controllers 18) confirming that the partner controller 18b is working and has the necessary operating system 73b and is not otherwise linked to another primary controller 18a. The confirmation process of block 98 works with a corresponding process block 100 in the partner controller 18b.

If partnership is verified, each controller 18a and 18b records this relationship and partner controller 18b enters the safety task 72b in a task queue similar to that of task queue 86. Unlike the task queue 86, however, the task queue of the partner controller 18b will contain only safety tasks and the operating system 73b will schedule safety tasks only in response to the schedule followed by the operating system 73a. Generally, for real time control, each safety task 72b and standard task 72a is scheduled to be repeatedly executed at no less than a predetermined period to provide for suitable response time needed for control applications.

At succeeding process blocks 102 and 104 executed in the primary controller 18a and partner controller 18b, respectively, regions 84b in memory 60 in each of the primary controller 18a and partner controller 18b is cleared for the receipt of the safety task 72b. The regions 84b will be initially designated read only in the register 82 for the MPU 81 of the primary controller 18a and partner controller 18b.

At process block 106 and 108 executed in the primary controller 18a and partner controller 18b, respectively, the safety task 72b is accepted from the programming terminal 32 at the primary controller 18a and forwarded to the partner controller 18b as indicated by arrow 110 to be accepted by the partner controller 18b per process block 108 which replies with an acknowledgment signal 112 indicating that the task 72b has been properly received, being complete and correct. Generally, the safety task 72b is transmitted in portions and these process blocks 106 and 108 are repeated as indicated by the next loop of process block 114 for the primary controller 18a and 116 for the partner controller 18b until all portions are transmitted.

Once the safety task 72b has been fully received at the primary controller 18a and transmitted without error to the partner controller 18b, the transfer program is done as indicated by process block 118 and awaits possible loading of an additional task. Any errors in these blocks results in an error condition being reported to the user and the safety program being prevented from executing.

As a result of the transfer process, the tasks loaded into the primary controller 18a and secondary controller 18b are identical, and therefore if the user needs to upload the tasks, this may be accomplished with communication solely with the primary controller 18a as is done with a conventional controller. A similar procedure is used for program portions describing incremental on line editing of the tasks, that is, the user communicates with the primary controller 18a and the editing information is passed along to the secondary controller 18b by the primary controller 18a.

Figure 7:
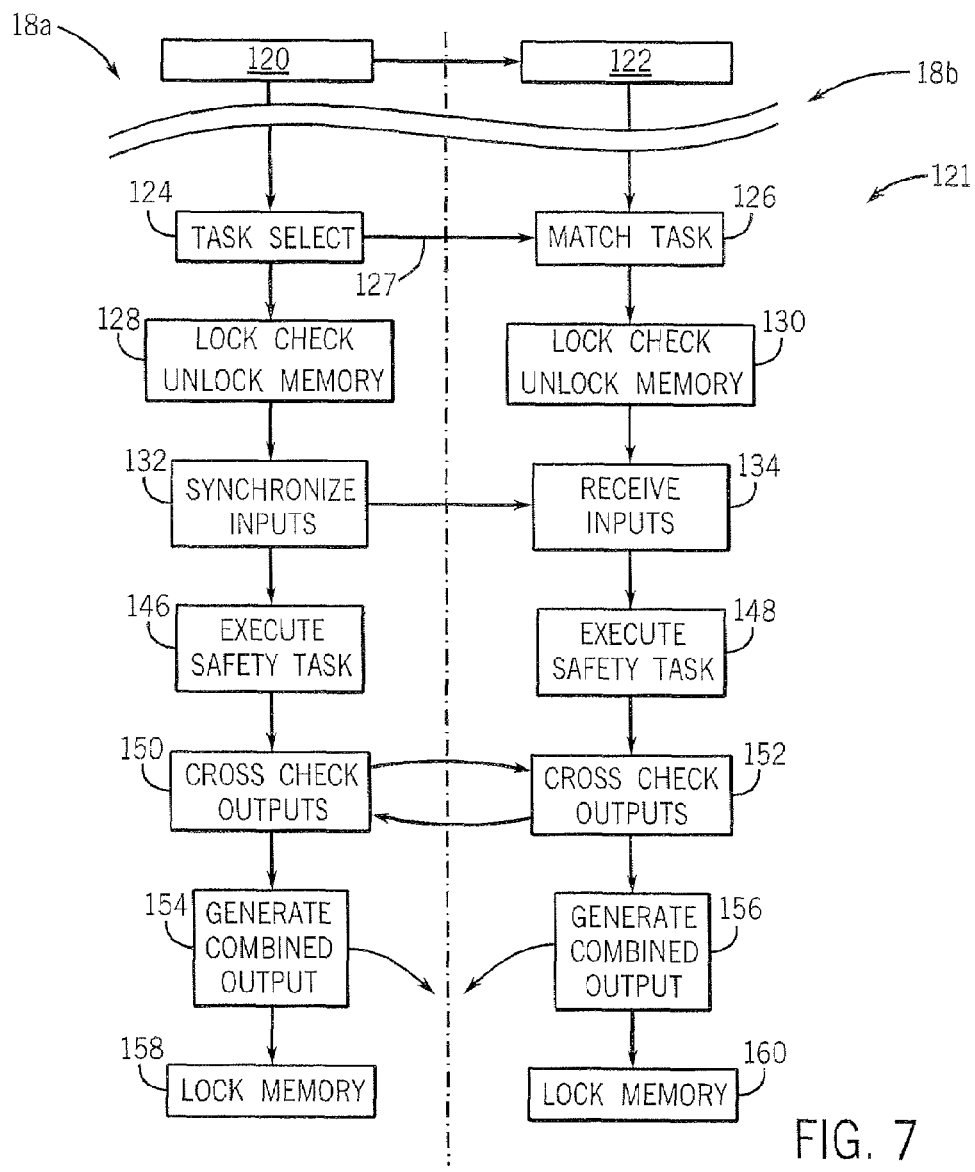
FIG. 7 is a flow chart showing execution of the safety task on the primary and partner controllers.

Referring now to FIG. 7, upon completion of the loading of the necessary standard tasks 72a and safety tasks 72b, the dual controller safety system 10 may be placed in a "run" mode, for example, through the use of key switch 28 shown in FIG. 1 which communicates this state to the partner controller 18*b* by a message over the backplane 26 whose transmission is indicated by process block 120 executed in primary controller 18*a* and whose reception is indicated by process block 122 executed in partner controller 18*b*.

At a first process block 124, executed by the operating system 73*a* of the primary controller 18*a*, the primary controller 18*a* schedules either a safety task 72*b* or standard task 72*a* for execution. Generally the operating system of 73*b* of partner controller 18*b* follows the scheduling by primary controller 18*a* and needs to provide fewer functions than the operating system 73*a*.

Assuming a safety task 72*b* is selected per task select block 124, the operating system 73*a* begins a synchronization program 121 starting with the forwarding of a message 127 to the operating system 73*b* of partner controller 18*b* indicating that a safety task 72*b* is about to be executed so that the operating system 73*b* can find that task 72*b* in its task queue 86 as indicated by process block 126.

The operating system 73*a* and 73*b* then proceed to succeeding process blocks 128 and 130, respectively, where the registers 82 of the MPUs 81 for the memory region 84*b* holding the tasks 72*b* and its variables 76 are checked to ensure that these regions 84*b* are correctly in read only mode. If the regions 84*b* of the memories 60 are not in the read only mode, this indicates a problem with the previous locking of the memory upon conclusion of a safety task and an error is generated and further execution is suspended until the user corrects the problem.

If the lock check of process blocks 128 and 130 indicates that the regions 84*b* were locked (e.g., in read only status), then the regions 84*b* are unlocked (e.g., moved to read/write status) and operating systems 73*a* and 73*b* proceed to process blocks 132 and 134, respectively. This unlocking step could alternatively be performed by the safety task itself as a first step so long as task execution is not interrupted by the operating system.

At these process blocks, the inputs for the safety tasks 72*b* representing input values of the safety variables 76 are synchronized for each of the primary controllers 18*a* and partner controller 18*b*.

Referring momentarily to FIG. 10, generally input values 76*b* are received solely by primary controller 18*a* asynchronously through interface circuit 50 to be held in asynchronous buffer 140 formed as part of memory 60. This buffer 140 may fill up in an ordered manner according to a scan conducted asynchronously with task scheduling by the operating system 73*a* or may fill up on a random basis according to changes in input variables 76 that trigger a communication of messages to the primary controller 18*a*. In the present invention, it is necessary that the input variables 76 exist as identical copies in the memories 60 of the primary controller 18*a* and partner controller 18*b*. This synchronization is accomplished by an ordered read out of buffer 140 simultaneously into clean buffers 142 and 144 in primary controllers 18*a* and partner controller 18*b*, respectively, during process blocks 132 and 134. In this process, all input data flows from the primary controller 18*a* to the partner controller 18*b* so as to eliminate any possibility that different input variables 76 would be in the controllers 18*a* and 18*b* as might occur if input variables 76 were communicated directly to each of the primary controller 18*a* and partner controller 18*b* separately.

This same procedure allows "forcing" of inputs to be synchronized between the primary controller 18*a* and the secondary controller 18*b*. The primary controller 18*a* places the forced inputs into the buffer 140 with a tag to prevent them from being overwritten, and the forced input is naturally conveyed to the secondary controller 18*b*.

Referring again to FIG. 7, upon completion of the synchronization of inputs, as indicated by process blocks 146 and 148, the operating systems 73*a* and 73*b* execute the safety tasks 72*b* independently in the primary controller 18*a* and partner controller 18*b*, respectively, without further synchronization. This provides for extremely rapid execution of the safety tasks 72*a* without undue communication delays.

At succeeding process blocks 150 and 152, in the primary controller 18*a* and partner controller 18*b*, respectively, primary controller 18*a* sends its output variables to partner controller 18*b* and partner controller 18*b* sends its output variables to primary controller 18*a* in a cross-checking process. Each of the primary controller 18*a* and partner controller 18*b* then compares its own output values to those computed by the other controller. If there is an error, a safety state is entered, otherwise each primary controller 18*a* and partner controller 18*b* proceeds to respective process blocks 154 and 156 where they generate a combined output value set for transmission over the network 134 or backplane 26 according to a high reliability protocol. The safety state, as is understood in the art, invokes a set of predefined output values and ceases operation of the control process notifying the operator of an error.

In the present invention, a series of combined data words are generated containing a convenient block of output values computed by primary controller 18*a* and a complement of the same output values computed by partner controller 18*b*.

After completion of the generation of the output word described by process blocks 154 and 156, the safety task 72*b* is complete and the operating system locks the region 84*b* of memory 60 back to read only mode as indicated by process blocks 158 and 160 and proceeds to the next task as scheduled. Alternatively, the locking could be performed by the finals step of the safety task itself, so long as task execution is not interrupted by the operating system.

Referring to FIGS. 6 and 8, if at process block 124 of FIG. 7, the task select block selects a standard task 72*a*, then the operating system 73*a* simply begins execution of that task on primary controller 18*a* by reading of the input variables 76 as indicated by process block 162. Execution of the standard task indicated by process block 164 and transmission of output values as indicated by process block 166. Each of these steps is well understood in the art. The partner controller 18*b* does not execute the standard task but waits for another safety task. The transmission of outputs needs not observe the safety protocol as described.

Referring now to FIG. 9, the operating system 73*a* and 73*b* of primary controller 18*a* and partner controller 18*b* may periodically execute two additional standard tasks, for example, once every few hours. The first task indicated by process block 170 is a standard task that attempts to write data from each safety task identified by task queue 86. If the write fails, for example, by generating an exception, the task completes successfully. Otherwise, if the write is successful, a safety state may be invoked or an error reported to the user because memory lock was not in place.

The second task 172 provides a comparison at periodic intervals of the internal safety variables 76*b* that form neither inputs nor outputs of the standard processes 42 and 46, between primary controller 18*a* and partner controller 18*b* to check that they are in fact identical, even if the output variables may not show any deviation between the execution of the safety tasks 72*a*. The variables to be compared are buffered while execution of other tasks is stopped.

Referring now to FIG. 11, software scoping of variables between safety task 72b and standard tasks 72a is augmented by the architecture of the present invention. If, for example, safety tasks 72b in primary controller 18a and partner controller 18b, attempt to read or write from memory regions 82a associated with standard tasks 72a and standard variables 76a, the safety task 72b in partner controller 18b will be unable to access the address which will not exist in the partner controller 18b. This failure will either result in an exception, if an erroneous value is read, or will result in a discrepancy between the values retrieved by the tasks 72b producing an error in their ultimate outputs. If standard task information were in both of the primary controller 18a and partner controller 18b, such a failure would operate symmetrically and might not be detected.

Referring to FIG. 12, conversely, if a standard task 72a attempts to write from memory regions 82b holding safety task 72b or safety variables 76b, it will be blocked by the MPU or if it does successfully write, it will write only to region 82b associated with primary controller 18a and not to region 82b associated with partner controller 18b. Again, this asymmetrical writing will result in a change in one of the programs 72b only that will result in a difference in the output variables compared at block 150 and 152 of FIG. 7.

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside of the scope of the present invention including: design of the safety system, installation, and maintenance of the components of the safety system, and the cooperation and training of individuals using the safety system. Although the present invention is intended to be highly reliable, all physical systems are susceptible to failure and provision must be made for such failure.

It is specifically intended that the present invention not be limited to the embodiments and illustrations contained herein, but include modified forms of those embodiments including portions of the embodiments and combinations of elements of different embodiments as come within the scope of the following claims.

We claim:

1. A safety controller comprising:
a primary and partner independent controller communicating on a communication bus;
a communication interface for receiving safety program information from a user to the primary controller;
a transfer program executable on the primary and partner controller to automatically load the safety program information received by the primary controller via the communications bus to the partner controller; and
a synchronization program executable by the primary and partner controller to execute the safety program information on the primary and partner controller and compares execution of the safety program information and to enter a safety state when this execution differs;
wherein the safety program information is a set of control instructions.

2. The safety controller of claim 1 wherein the communication interface confirms the existence of the partner controller having the transfer and synchronization program and receives safety program information only when the confirmed partner controller is communicating with the primary controller on the communications bus.

3. The safety controller of claim 1 wherein the safety program information executes to generate outputs to be used to control an external device and wherein the synchronization program compares execution of the safety program information by comparing outputs generated by the primary and partner controller executing the safety program information.

4. The safety controller of claim 3 wherein the safety program information is executed repeatedly and wherein the comparison of the outputs is performed at the conclusion of each repeated execution prior to outputting of the outputs to the external device.

5. The safety controller of claim 1 wherein the safety program information executes to generate values of internal variables and wherein the synchronization program compares execution of the safety program information by comparing values of internal variables generated by the primary and partner controller executing the safety program information.

6. The safety controller of claim 5 wherein the safety program is executed repeatedly and wherein the comparison is performed at a period greater than the repetition period.

7. The safety controller of claim 1 wherein the transfer program transfers the safety program information from the primary controller to the partner controller and receives an acknowledgement from the partner controller to the primary controller indicating that the transfer was complete and correct.

8. The safety controller of claim 7 wherein the transfer program transfers the state program information in portions and receives an acknowledgement for each portion.

9. The safety controller of claim 1 wherein the primary controller holds an identification value indicating to a user device having safety program information that the primary controller may receive safety program information and wherein the partner controller does not hold the identification value indicating to the user device having safety program information that it may receive safety program information.

10. The safety controller of claim 1 wherein the communication interface also receives standard program information and wherein the safety program information holds an identification value indicating that it is part of a safety application and wherein the transfer program checks for this identification value to automatically load only the safety program information received by the primary controller via the communications bus to the partner controller.

11. The safety controller of claim 1 wherein the primary and partner controllers are contained in independent housings separately attachable to an intercommunication bus.

12. The safety controller of claim 11 wherein the second housing holds fewer components than the first housing to provide limited functionality.

13. The safety controller of claim 12 wherein the communication interface includes a physical connector exposed on the housing of the first controller and not present on the housing of the partner controller.

14. The safety controller of claim 1 wherein the housing of the primary controller includes a user accessible switch defining a run and a program state and wherein a user accessible switch defining a run and program state is not included on the housing of the partner controller.

15. The safety controller of claim 1 wherein the housing of the primary controller provides a user settable a run and a program state; wherein the transfer programs communicate the run and program state defined by the user to the partner controller; and wherein the synchronization program executes the safety program information in the primary and partner controller according to the run and program state.

16. The safety controller of claim 1 wherein the communication interface further operates to upload safety program information to a user from the primary controller without uploading corresponding safety program information from the partner controller.

17. The safety controller of claim 1 wherein the safety program information is also variables used by a safety program.

18. The safety controller of claim 1 wherein the communications bus is a serial communications network connecting the primary and partner controller.

19. The safety controller of claim 1 wherein the safety program information is at least one instruction causing an editing of a safety program.

20. The safety controller of claim 1 wherein the safety program information is at least one value of a variable used by a safety program.

21. The safety controller of claim 1 wherein the communication bus is a backplane having releasable electrical connectors allowing connection of the primary and partner independent controller to and from the backplane.

22. A safety controller comprising:
a primary controller including a memory for holding program information; a communication interface for receiving program information from a user, the programming information including an identifier indicating whether the programming information is a safety task;
a loader program reading program information from the communication interface and:
(i) when the program information is a safety task, determining whether a partner controller is in communication with the primary controller and if a partner controller is present, loading the memory of the primary controller with the program information and transmitting the program information to the partner controller; and
(ii) when the program information is a not safety task, loading the memory of only the primary controller with the program information;
wherein the loader program rejects safety tasks when a partner controller is not in communication with the primary controller.

23. A computer program stored on a computer recordable medium executing on a computer
computer to:
(i) accept program instructions from a user describing the logical combination of input sensor data to produce output control data;
(ii) collect the program instructions into logical task;
(iii) identify the task as to one of two levels of reliability, a first level executable on a single processor and a second level requiring execution in tandem on two processors having an ability to compare execution to determine a fault in either of the two processors and to then enter a safety state; whereby a controller receiving the tasks may automatically configure itself for the proper level of reliability or indicate a failure if that level of reliability cannot be obtained.

24. The computer program of claim 23 wherein the program further accepts variable definitions from the user describing variables used by the program instructions, the variable definitions identifying the variables as to tasks identified to one of the two levels of reliability; whereby variables may be properly allocated within the controller architecture for high reliability storage and modification.

25. A method of operating a safety controller having a primary and partner independent controller communicating on a communication bus comprising the steps of:
(a) receiving safety program information from a user to the primary controller;
(b) transferring the safety program information received by the primary controller via the communications bus to the partner controller; and
(c) executing the safety program information on the primary and partner controller and comparing execution of the safety program information to enter a safety state when this execution differs;
wherein the safety program information is a set of control instructions.

26. The method of claim 25 including the step before step (a) of confirming the existence of the partner controller having the transfer and synchronization program to receive safety program information only when the confirmed partner controller is communicating with the primary controller on the communications bus.

27. The method of claim 25 wherein the safety program information executes to generate outputs to be used to control an external device and wherein step (c) compares execution of the safety program information by comparing outputs generated by the primary and partner controller executing the safety program information.

28. The method of claim 27 wherein the safety program information is executed repeatedly and wherein the comparison of the outputs is performed at the conclusion of each repeated execution prior to outputting of the outputs to the external device.

29. The method of claim 25 wherein the safety program information executes to generate values of internal variables and wherein step (c) compares execution of the safety program information by comparing values of internal variables generated by the primary and partner controller executing the safety program information.

30. The safety controller of claim 29 wherein the safety program is executed repeatedly and wherein the comparison is performed at a period greater than the repetition period.

31. The method of claim 25 wherein step (b) transfers the safety program information from the primary controller to the partner controller and receives an acknowledgement from the partner controller to the primary controller indicating that the transfer was complete and correct.

32. The safety controller of claim 31 wherein step (b) transfers the state program information in portions and receives an acknowledgement for each portion.

33. The method of claim 25 wherein the primary controller holds an identification value indicating to a user device having safety program information that the primary controller may receive safety program information and wherein the partner controller does not hold the identification value indicating to the user device having safety program information that it may receive safety program information and wherein at step (a) the user employs the identification value to identify the primary controller.

34. The method of claim 25 wherein the communication interface also receives standard program information and wherein the safety program information holds an identification value indicating that it is part of a safety application and wherein step (b) checks for this identification value to automatically load only the safety program information received by the primary controller via the communications bus to the partner controller.

35. The method of claim 25 wherein the primary controller provides for a run and a program state and wherein step (b) communicates the run and program state to the partner controller; and step (c) executes the safety program information in the primary and partner controller according to the run and program state.

36. The method of claim 25 including step (d) of upload safety program information to a user from the primary controller without uploading corresponding safety program information from the partner controller.

37. The method of claim 25 wherein the safety program information is also variables used by a safety program.

38. The method of claim 25 wherein the safety program information is at least one instruction causing an editing of a safety program.

39. The method of claim 25 wherein the safety program information is at least one value of a variable used by a safety program.

40. A method of operating a safety controller having a primary controller including a memory for holding program information comprising the steps of:
   (a) receiving program information from a user, the programming information including an identifier indicating whether the programming information is a safety task; and
   (b) determining whether a partner controller is in communication with the primary controller; and
   (i) when a partner controller is present, loading the memory of the primary controller with the program information and transmitting the program information to the partner controller; and
   (ii) when the program information is not safety task loading the memory of only the primary controller with the program information;
   wherein at step (b)(i) when a partner controller is not in communication with the primary controller present, rejecting the safety tasks from the user.

41. A method of programming a safety controller having a primary and partner independent controller communicating on a communication bus comprising the steps of:
   (i) accepting program instructions from a user describing the logical combination of input sensor data to produce output control data;
   (ii) collecting the program instructions into logical task;
   (iii) identifying the task as to one of two levels of reliability a first level executable on a single processor and a second level requiring execution in tandem on two processors having an ability to compare execution to determine a fault in either of the two processors and to then enter a safety state; and
   (iv) transmitting the tasks to the safety controller so that the safety controller can automatically configure itself for the proper level of reliability or indicate a failure if that level of reliability cannot be obtained.

* * * * *